United States Patent

[11] 3,607,012

[72] Inventors Frederick V. Schossberger, deceased
 late of Hinsdale, Ill.; by Paul A. Teschner,
 316 E. 6th St., Hinsdale, Ill. 60521,
 executor; Frank Anthony Ticulka,
 10934 S. Esmond St., Chicago, Ill.
 60643; James Cooperman, U.S. Agency for
 International Development American
 Embassy, West Building, Chanakyapuri,
 New Delhi, India; Klaus F. Guenther,
 Unterliedersbach, Loreleistrosse 7, 6230
 Frankfurt am Main, Germany
[21] Appl. No. 661,719
[22] Filed Aug. 18, 1967
[45] Patented Sept. 21, 1971

[54] PROCESS FOR THE PRODUCTION OF TITANIUM AND IRON MATERIAL
 11 Claims, No Drawings
[52] U.S. Cl. .................................................. 23/87,
 23/51, 23/154, 23/172, 23/200, 75/101, 75/108
[51] Int. Cl. ............................................. C01g 23/00,
 C01g 23/02
[50] Field of Search .................................. 23/87 T, 87,
 51, 200, 154, 172; 75/101, 108

[56] References Cited
 UNITED STATES PATENTS
2,476,453 7/1949 Peirce et al. ................. 75/30
2,857,242 10/1958 Schossberger ............... 23/51 X
2,857,243 10/1958 Schossberger ............... 23/87
3,076,692 2/1963 Ruter et al. .................. 23/87 X
3,236,596 2/1966 Zirngibl et al. ............... 23/87 X
3,407,033 10/1968 Ruter et al. .................. 23/87

Primary Examiner—Edward Stern
Attorney—Hill, Sherman, Meroni, Gross & Simpson

ABSTRACT: A process for the recovery of titanium tetrachloride and iron from ore materials containing a mixture thereof in combination with other diverse materials by subjecting the ore materials to a leaching solution to remove the iron and titanium from the ore materials and separately removing the iron and titanium from the leaching solution, with a recovery and recycling of the processing materials. The iron is removed from the leaching solution by saturating the solution with hydrogen chloride gas to precipitate ferrous chloride, which is decomposed by oxidation to iron oxide. Iron oxide is utilized for steel manufacture and free iron powder production. The titanium is recovered from the iron-free leaching solution by the addition of alkali chloride with the application of pressure to precipitate alkali chlorotitanate which is decomposed to titanium tetrachloride, which is utilized as a raw material for the production of titanium metal, titanium dioxide and other titanium compounds. Titanium metal is used in the manufacture of aircraft components as well as other corrosive-resistant equipment. Titanium dioxide is used as white pigment in paints, enamels, plastics and other products.

PROCESS FOR THE PRODUCTION OF TITANIUM AND IRON MATERIAL

BACKGROUND OF THE INVENTION

This invention relates to a process of recovering titanium tetrachloride and free iron from a solution containing titanium, iron and other diverse materials. More particularly this invention encompasses the process whereby titanium-iron containing solutions are converted to useful titanium materials and iron materials with recycling of the processing materials.

While titanium materials and iron materials are recoverable by a number of different processes from various ores, normally, when titanium bearing ores (which generally also bear various amounts of iron) are utilized, only titanium materials are recovered and the remainder of the ore, including the iron therein is waste. Thus, when titanium bearing ore, such as ilmenite is utilized, it is treated with a strong acid solution to separate the titanium (and iron) from the other materials. The acid titanium-iron solution is then treated with hydrogen chloride and alkali chloride under reduced temperatures to precipitate alkali chlorotitanates, which may then be decomposed to titanium tetrachloride or reduced to the titanium metal. The acid solution and iron therein are discarded as waste because of various difficulties encountered in the removal of contaminates therefrom. Various methods utilizing the above-described processes have been described and claimed by F. V. Schossberger in U.S. Pat. Nos. 2,857,242; 2,857,243; 2,857,264 and 2,859,265, all of which patents are incorporated herein by reference.

The present invention contemplates improvements in the process of recovering titanium materials whereby a more economical process for the recovery of titanium materials is produced which also allows recovery of iron materials and the processing materials while yielding higher quality titanium materials at a reduced cost.

SUMMARY OF THE INVENTION

It is, accordingly, an important object of the present invention to provide an improved process for the recovery of titanium materials from titanium bearing ores at a reduced cost.

It is another object of the present invention to provide a process for the recovery of useful iron and titanium from ores containing a mixture thereof with various other diverse materials.

It is yet another object of the invention to provide a process for the recovery of useful iron and titanium from ores containing a mixture thereof with various other diverse materials whereby the processing materials are recovered and recycled.

It is yet a further object of the invention to provide a process for the recovery of high quality titanium and iron from ores containing a mixture thereof with other diverse materials that is relatively simple and economical to operate.

It is still a further object of the invention to provide a process for the recovery of useful titanium and iron from ores containing a mixture thereof with other diverse materials whereby the ores are subjected to a leaching solution to remove iron and titanium from the ores and separately precipitating iron and titanium from the leaching solution with the recovery and recycling of the leaching agents.

Other objects, advantages and features of the invention will become more apparent with the teachings of the principles of the present invention and in connection with the disclosure of the preferred embodiments thereof in the specification and claims.

DESCRIPTION OF THE PREFERRED EMBODIMENTS

Titanium and iron are produced in accordance with the principles of the instant invention from any convenient ore material containing a mixture of the same. The process of the instant invention is useful not only on materials having titanium and iron therein but also on materials having a relatively low content of iron, titanium or mixtures thereof. Examples of the preferred ore materials include ilmenite, titaniferrous ore, slag, rutile, etc.

The ore materials are obtained by any conventional means, as mining, and are milled or otherwise reduced to particle size to obtain a substantially uniform particle size, preferably such that pass through a 250 to 350 mesh wire screen. The pulverized ore material is then digested with a sulfuric acid (95 percent) solution. The ratio of ore material to sulfuric acid generally ranges from 1:1 to about 1:2. The ore-sulfuric acid mixture is preferably subjected to constant stirring and controlled temperature so as not to exceed about 200° C., thereby preventing undue hydrolysis of the digested titanium.

The resulting mixture is cooled to ambient temperature and forms a relatively hard cake material which may, if desired, be further pulverized by a hammermill or the like. The pulverized digested material is then leached with an aqueous hydrochloric acid (20 percent) solution or a mixture of hydrochloric and sulfuric acids (an acid-water mixture may also be utilized). As will be appreciated, the digestion and leaching steps may be combined if desired. The acid-digested material mixture is preferably subjected to constant stirring over a period of time ranging from several hours up to 24 hours. After this constant stirring, the mixture is allowed to settle so that any undissolved ore materials settle to the bottom of the reaction vessel and the supernatant liquid containing titanium and iron mixtures is decanted for further processing. Of course, if desired, the settled ore materials may be redigested and releached to insure complete removal of any titanium and iron therefrom. In addition, the supernatant liquid may be centrifuged or filtered to hasten the removal of any undissolved materials, which may be recombined with the settled ore materials for reprocessing as hereinbefore described.

The titanium-iron solution, which contains ferric and ferrous ions, is then subjected to a reducing agent, such as iron gauze or iron powder, to convert all of the iron to the ferrous state in order to achieve a high yield of useful iron. The reduction process is stopped when a positive result is noted on a spot test by the decoloration of ferric thiocyanide, indicating that a portion of the tetravalent titanium is being reduced to the trivalent state. It is important to prevent excessive reduction of titanium to its trivalent state as this materially hinders high titanium recovery.

The titanium-ferrous acid solution is then saturated with hydrogen chloride gas. Saturation is aided by the use of slight positive pressure. The temperature of the solution is generally maintained at ambient, i.e., 15° to 30° C. Hydrogen chloride gas reacts with the ferrous ions in solution to form ferrous chloride which precipitates to remove at least 95 percent of the iron in solution. The precipitated ferrous chloride is then collected, as by filtration or centrifuge, and washed with a highly concentrated hydrochloric acid (obtained by hydrogen chloride saturation of hydrochloric acid at 40 p.s.i.g. and ambient temperature of 25° C.), a 1-1 mixture of dioxane and hydrochloric acid (37 weight %), or other suitable agent to remove any adherent sulfate ions or other contaminants from the ferrous chloride. As will be appreciated, washing may be omitted where the amount of contaminant is not detrimental to the desired product. The substantially pure ferrous chloride, which is obtained by such a procedure, may then be converted into ferrous oxide or iron powder, as desired. Thus, the ferrous chloride is treated with steam in an oxygen atmosphere to form ferrous oxide, with recovery of the hydrogen chloride, which is recycled into the hereinbefore described process for further treatment of the titanium-iron-acid solution. The ferrous oxide obtained is substantially sulfur-free and ready for use in steel manufacture or iron powder production.

The iron recovery process is not dependent on the titanium present in the solution, nor is it limited thereto, but can be utilized for recovery of iron from other iron containing media, such as waste solutions produced during acid-pickling treatments, commonly practiced in the manufacture of steel and related metallizing operations. Thus, the iron in such a waste solution can be converted to the ferrous state and precipitated as ferrous chloride for conversion to ferrous oxide, with recovery of the useful acids in the solution, thereby substantially eliminating costly waste disposal problems.

The iron-free titanium solution is then again saturated with hydrogen chloride gas at ambient temperatures and increased pressure. Generally, a pressure of 40 to 60 p.s.i.g. are preferred, although a gauge pressure of 1 to 5 atmospheres is usable. The solution is temperature controlled as the dissolution of the gas tends to raise the temperature of the solution above ambient, which is undesirable. Pulverized alkali (including ammonium chloride) is then stirred into the pressurized titanium solution with an almost immediate formation of alkali chlorotitanate which precipitates to remove at least 98 percent of the titanium in solution. The alkali chloride is preferably added in small increments until a weight ratio of alkali chloride to titanium in the range of 4:1 to 1:1 and preferably 3.5:1 to 2.5:1 is achieved to precipitate substantially all of the titanium from solution.

The precipitated alkali chlorotitanate is collected by filtration or the like and washed with hydrochloric acid solution (preferably concentrated HCl acid saturated with HCl gas at 40 p.s.i.g.) or other nonaqueous liquid containing dissolved hydrogen chloride, to remove the sulfuric acid and other contaminants contained in the mother liquor from the crystals of the alkali chlorotitanate. Suitable nonaqueous liquids include dry organic solvents such as acetone and ethylacetate and other relatively volatile liquids. The washed alkali chlorotitanate is then slowly dried to remove physically and chemically bound water so that the crystals have a final moisture content of about 0.03 percent.

The preferred drying agent is dry hydrogen chloride gas, which is passed through the alkali chlorotitanate while gradually increasing the temperature thereof from 40° C. to about 300° C. to yield an alkali chlorotitanate having less than 1 percent of compound adhering thereto, such as water, which might cause hydrolysis.

The dried alkali chlorotitanate, which may be useful per se as a catalyst for the polymerization of ethylene to polyethylene, is then thermally decomposed at a temperature range of 300° C. to 700° C. to produce titanium tetrachloride that is useful as raw material in the production of titanium dioxide, titanium metal and other titanium compounds. The titanium tetrachloride is recovered by condensation and the alkali chloride which remains as a residue in the decomposition chamber can be recycled for additional treatment of iron-free titanium solution substantially as described hereinbefore.

After the alkali chlorotitanate is precipitated and removed from the solution, the mother liquor is passed into a stripper or distiller and heated for distillation of the acids therein. The distillation apparatus is slowly heated to evolve hydrogen chloride gas. The degassing process generally proceeds at a relatively rapid rate at relatively low temperatures in the order of 40° C. to 100° C. The recovered hydrogen chloride gas may be recycled for further treatment of additional iron-titanium acid solutions as hereinbefore described. Further heating causes distillation of various fractions of hydrogen chloride-water mixtures which may be used as is or combined and adjusted to preferred concentrations, i.e., 20 percent aqueous hydrogen chloride solution, and recycled for further treatment of additional digested ore materials as hereinbefore described. Any mother liquor remaining after washing the precipitated alkali metal chlorotitanate is separated into its individual constituents by sequential distillation, said individual constituents comprising hydrogen chloride gas, aqueous hydrochloric acid solution containing 20 percent to 40 percent HCl, a constant boiling HCl-water mixture, and concentrated sulfuric acid, said individual constituents being suitable for recycling.

After all of the hydrogen chloride-water mixture has been distilled, the heating is discontinued and the residual mother liquor, which consists essentially of concentrated sulfuric acid, is adjusted to a preferred concentration, i.e., 66° Baume, and recycled for further treatment of the ore materials as described hereinbefore. The recovery of the processing materials is essentially complete, thereby allowing an economical process for the production of high quality titanium and iron materials.

In order to evaluate the quality of the titanium tetrachloride obtained by the process hereinbefore outlined, a spectrochemical analysis and comparison was made between a sample (A) obtained from a high temperature chlorination process of rutile (designated as technical grade and commercially available from Fisher Scientific Company), a second sample (B) obtained from a high temperature chlorination process of rutile (designated as purified grade and commercially available from J. T. Baker Chemical Company), and a third sample (C) of crude (unpurified) titanium tetrachloride obtained from the hereinafter described sample.

The individual titanium tetrachloride samples were dissolved in dilute hydrochloric acid (reagent grade) and then converted to the sulfate. The samples were then calcined to the oxide, all in accordance with the conventional process. The oxides were mixed with graphite in the ratio of 9:1 and burned to completion in a 7-amp DC arc using a Stallwood jet with controlled atmosphere using an oxygen-argon mixture, at a ratio of 1:5. The optical system was a Jarrell-Ash spectrometer with a 3.4 meter Ebert mount. The results are set forth in table I.

TABLE I.—SPECTROGRAPHIC ANALYSES OF CRUDE TITANIUM TETRACHLORIDE

| Element (wt. percent) | Sample A | Sample B | Sample C |
| --- | --- | --- | --- |
| Al | 0.100–0.200 | N.d. | N.d. |
| Ca | 0.005–0.100 | B. 0.001 | B. 0.001 |
| Cb | P. | P. | P. |
| Cr | 0.100–0.200 | 0.0015–0.0005 | 0.0015–0.0005 |
| Cu | 0.005–0.100 | N.d. | N.d. |
| Fe | 0.700–2.000 | P. | P. |
| Mg | 0.010–0.070 | S.b. 0.001 | 0.001–0.0001 |
| Mn | 0.005–0.008 | N.d. | N.d. |
| Mo | 0.003–0.004 | N.d. | N.d. |
| Ni | 0.010–0.030 | N.d. | N.d. |
| P | P. | N.d. | N.d. |
| Pb | P. | N.d. | N.d. |
| S | N.d. | P. | P. |
| Si | 0.600–0.800 | S.b. 0.001 | 0.0015–0.0005 |
| V | 0.040–0.150 | B. 0.0001 | 0.00015–0.00005 | n.d. not detected
p. not available
b. below
s.b. slightly below

As can be seen from the above analyses, titanium tetrachloride produced by the instant process is substantially more pure than that produced by the direct chlorination. Therefore, a simplified purification process may be utilized to either oxidize the titanium tetrachloride to titanium dioxide pigment or reduce it to the metal. In addition, ores that contain large amounts of chromium and other pigment-discoloring elements can be economically utilized in the manufacture of titanium dioxide.

The following specific example will serve to illustrate, but not limit, the process of the present invention.

EXAMPLE 300 grams of ilmenite were ball-milled until at least 90 percent passed through a 325-mesh wire screen. The pulverized ore, containing 61.3 $TiO_2$, 12.0 FeO, and 31.7 percent $Fe_2O_3$ (based on Ti and Fe analysis), was digested with 204 ml. of $H_2SO_4$ (95 percent) and 11 ml. $H_2O$. The mixture was heated on a hotplate with constant stirring. The temperature was allowed to raise to 150° C., but not to exceed 200° C., with constant stirring until a solidified mass began appearing. The solidified mass was then cooled, pulverized by hammering, and leached with 475 ml. of 20 percent HCl aqueous solution. The pulverized cake mass and HCl solution were continually stirred for about 3.5 hours and then the mixture was allowed to settle and the supernatant liquor decanted. The ferric iron in the solution was then reduced with iron gauze in order to obtain high yields of useful iron, as ferric chloride tends to be too soluble.

The solution was then saturated with HCl gas under 40 p.s.i.g. pressure and at ambient temperature of 25° C. The saturation was accomplished by bubbling the HCl gas through the solution for 1 to 5 hours. A precipitate of $FeCl_2 \cdot 4H_2O$ formed and settled to the bottom of the solution. The precipitated ferrous chloride was removed from the solution by pressure filtration and washed with a 1:1 HCl-dioxane mixture. Substantially no $SO_4$ ions were detected in the washed ferrous chloride.

After the iron removal, the titanium solution was saturated with HCl gas at ambient temperatures and at increased pressure of 40 p.s.i.g. Subsequently, about 97 grams (5 percent in excess of the theoretical requirements) of powdered KCl (although other alkali, including ammonium chlorides may be used) was incrementally added to the pressurized solution with continuous stirring. A precipitate formed almost immediately and continued forming for a period of time. After about 5 hours the precipitate was removed by filtration and identified as solid potassium chlorotitanate. The precipitated potassium chlorotitanate was washed with the highly concentrated HCl acid (as previously defined). The washed material was placed in a rotary kiln having dry HCl gas passing therethrough and dried at a temperature beginning at about 40° C., and slowly raised to 280° C., at which time the chlorotitanate had less than 1 percent moisture.

The dried potassium chlorotitanate was then thermally decomposed at temperatures of 300° C. to 700° C. to produce titanium tetrachloride (and solid KCl, which is recyclable), a sample of which was analyzed to yield the results indicated at table 1, Sample C. The yield was 95 percent to 99 percent based upon the dehydrated potassium chlorotitanate.

The mother liquor, which is substantially iron and titanium-free, was passed into a distilling apparatus whereat it was heated to remove the hydrogen chloride, the aqueous HCl acid solution and the $H_2SO_4$ acid solutions, all of which may be recycled for further use in the hereinbefore described process.

From the foregoing, it will be evident that the process of the present invention provides a simple, convenient and economical means for the recovery of high quality titanium material and iron material from all types of ores and the like containing a mixture thereof, including ores containing low percentages thereof or containing large amounts of harmful contaminants. This process combines both the sulfate and chloride methods to produce superior quality titanium material. In addition, the processing materials, such as sulfuric acid, hydrochloric acid, alkali chlorides and hydrogen chloride gas are substantially fully recovered thereby reducing the operating expenses of the process.

It will be understood that the foregoing detailed description is given merely by way of illustrative example and that various modifications, changes and variations may be made therein without departing from the spirit and scope of the present invention.

We claim:

1. A process for the production of titanium tetrachloride and iron oxide from ore materials containing a mixture of titanium, iron and other materials comprising the steps of:
    a. reducing the ore materials to substantially uniformly sized particles,
    b. digesting the substantially uniformly sized particles with a sulfuric acid solution,
    c. leaching the uniformly sized particles-sulfuric acid solution mixture with an aqueous hydrochloric acid solution,
    d. removing undissolved ore materials from the acid solution,
    e. reducing any ferric iron in the acid solution to ferrous iron by subjecting said solution to a reducing agent,
    f. saturating the acid solution with hydrogen chloride gas to precipitate essentially all of the iron as ferrous chloride in the acid solution,
    g. collecting and washing the precipitated ferrous chloride to obtain substantially sulfate-free ferrous chloride,
    h. subjecting the ferrous chloride to a heated oxidizing atmosphere converting the ferrous chloride to iron oxide,
    i. maintaining the saturation of the iron-free acid solution with additional hydrogen chloride gas while applying a positive gas pressure of at least one atmosphere gauge thereto and substantially simultaneously adding an alkali metal chloride to the pressurized acid solution to precipitate substantially all the titanium as alkali metal chlorotitanate,
    j. collecting and washing the precipitated alkali metal chlorotitanate to remove any contaminants therefrom,
    k. passing dry hydrogen chloride gas through the alkali metal chlorotitanate while maintaining the temperature thereof in the range of 40° C. to 280° C. to desiccate said alkali metal chlorotitanate, and
    l. thermally decomposing the substantially dry alkali metal chlorotitanate to titanium tetrachloride by subjecting said alkali metal chlorotitanate to a temperature in the range of 300° C. to 700° C.

2. A process as defined in claim 1 wherein the ratio of alkali metal chloride to the titanium in the acid solution is about 4:1 to 1:1 and alkali metal chloride is recovered from step (1) and recycled to step (i) for treatment of additional amounts of the acid solution.

3. A process as defined in claim 1 wherein step (i) includes subjecting the saturated acid solution to a positive gas pressure having a maximum of 60 p.s.i.g. while maintaining said solution at ambient temperature.

4. A process as defined in claim 1 wherein any mother liquor remaining at step (j) is separated into its individual constituents by sequential distillation, said individual constituents comprising hydrogen chloride gas, aqueous hydrochloric acid solution containing 20 percent to 40 percent HCl, a constant boiling point HCl-water mixture, and concentrated sulfuric acid, said individual constituents being suitable for recycling.

5. A process for the production of titanium tetrachloride and iron oxide from an ore material containing a mixture of titanium, iron and other materials comprising:
    a. subjecting said ore to an aqueous acidic leaching solution comprised of constituents selected from the group consisting of HCl and $H_2SO_4$ and mixtures thereof, said leaching solution removing titanium and iron from said ore and separating the titanium and iron-containing solution from the remaining undissolved ore,
    b. reducing any ferric iron to ferrous iron in the acid solution by subjecting said titanium and iron-containing solution to a reducing agent,
    c. saturating the titanium and iron-containing solution with hydrogen chloride gas to precipitate the ferrous iron present in said solution as ferrous chloride thereby obtaining a solution that is essentially iron-free,
    d. collecting the precipitated ferrous chloride and converting said ferrous oxide to iron oxide,
    e. maintaining the saturation of the iron-free solution with additional hydrogen chloride and substantially simultaneously subjecting the iron-free solution to a positive gas pressure of at least one atmosphere gauge while adding alkali metal chloride to the solution to precipitate alkali metal chlorotitanate from said solution,
    f. collecting the precipitated alkali metal chlorotitanate and converting said chlorotitanate to titanium tetrachloride, and
    g. recovering the remaining constituents of the solution at step (e).

6. A process as defined in claim 5 wherein step (c) is carried out at a positive pressure of about 40 p.s.i.g. and said step (c) removes at least 95 percent of any iron in the titanium and iron-containing solution.

7. The process as defined in claim 6 wherein any iron collected at step (d) is substantially sulfate-free.

8. A process as defined in claim 5 wherein step (e) is conducted at a positive pressure in the range of a gauge pressure of 1 to 5 atmospheres.

9. A process as defined in claim 5 wherein the positive pressure utilized at step (e) is attained by the use of pressurized hydrogen chloride gas.

10. A process as defined in claim 5 wherein step (f) includes subjecting the alkali metal chlorotitanate to a stream of dry hydrogen chloride gas to desiccate the alkali metal chlorotitanate to a final moisture content of less than 1 percent and substantially simultaneously heating said alkali metal chlorotitanate to a temperature to the range of 300° C. to 700° C. thereby decomposing the alkali metal chlorotitanate to titanium tetrachloride.

11. A process as defined in claim 5 wherein step (g) includes distilling the recovered solution to separate hydrogen chloride gas and recycle such gas to steps (c) and (e), separate hydrochloric acid containing 20 percent to 40 percent by weight of HCl and recycling such acid to step (a), separate a constant boiling HCl-water mixture and recycle such mixture to step (a), and recycle any remaining solution to (a).